United States Patent Office 3,167,404
Patented Jan. 26, 1965

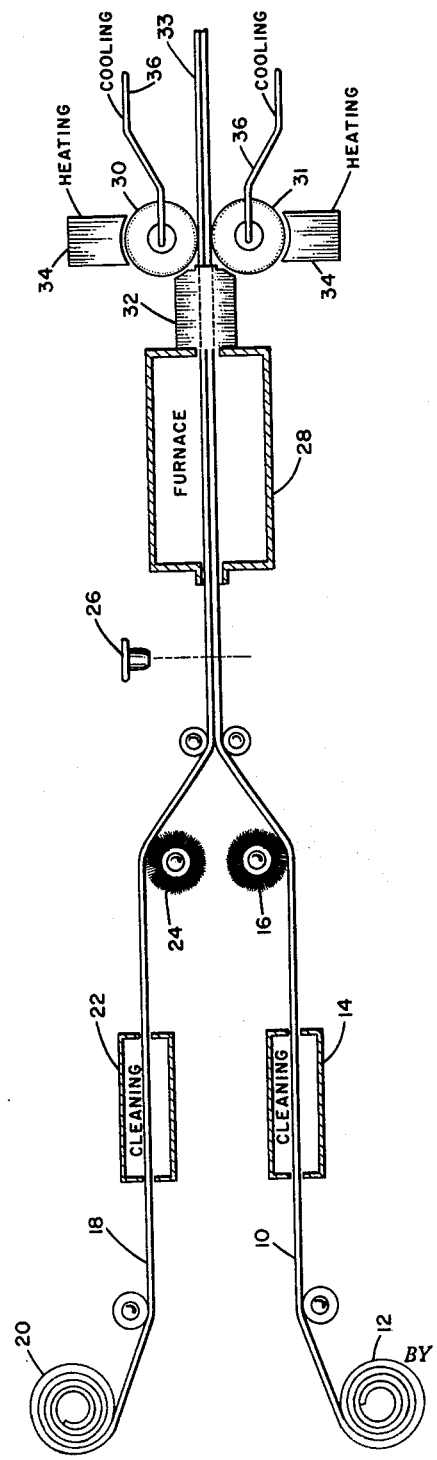

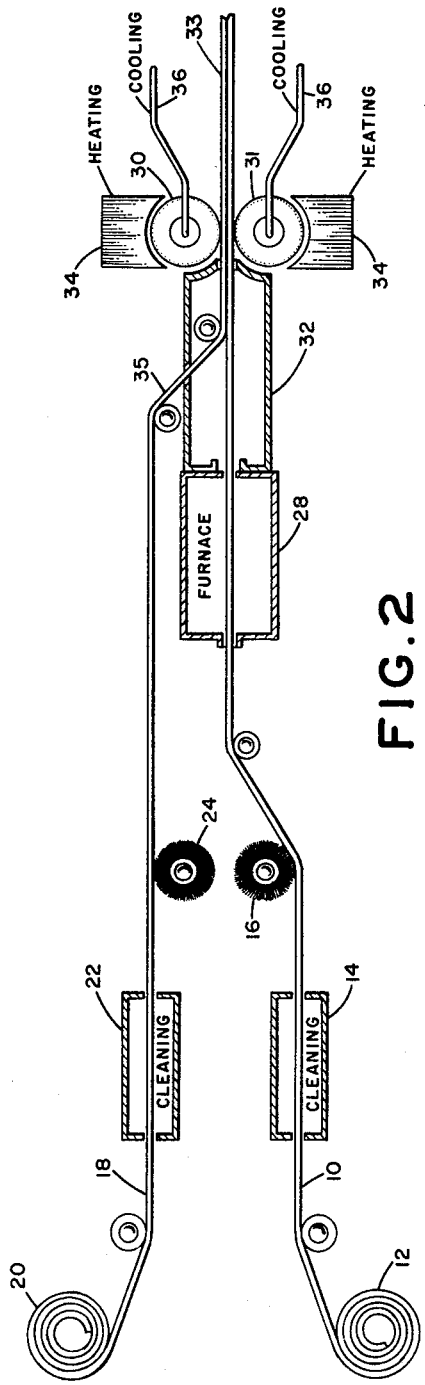
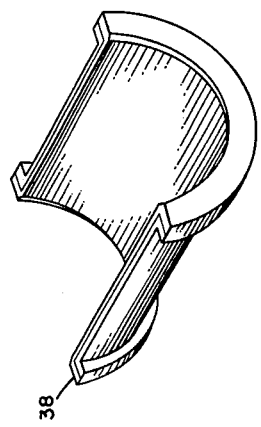

3,167,404
FLANGED BIMETALLIC BEARING
Wilbert H. Morrison and Donald W. Williams, Euclid, Ohio, assignors to Clevite Corporation, Cleveland, Ohio, a corporation of Ohio
Original application Dec. 28, 1959, Ser. No. 862,399, now Patent No. 3,093,885, dated June 18, 1963. Divided and this application Sept. 10, 1962, Ser. No. 222,998
3 Claims. (Cl. 29—196.2)

The present invention relates to a bimetallic strip, and is more particularly directed to the manufacture of a bimetallic strip for bearings composed of a strip of steel constituting a backing member and a layer of aluminum alloy united with one surface of the steel by means of a metallurgical bond. The composite material, thus formed, is of such a nature that it is capable of being bent and formed into various shapes without interruption of the bond between the aluminum alloy layer and the steel backing member.

This application is a division of United States Patent No. 3,093,885, issued June 18, 1963, to Wilbert H. Morrison and Donald W. Williams and assigned to the same assignee as the present invention.

The principle of this invention is applicable to a continuous type of process as well as to a batch-type operation and nothing herein is to be construed limiting the invention to a particular mode of operation.

It is of fundamental importance to have a substantial percentage of low melting point metal constituents in a bimetallic strip for superior bearing quality; this is well known. Similarly known is the difficulty to satisfactorily bond an aluminum base alloy comprising a substantial percentage of low melting point material, such as tin, to a ferrous metal. This is primarily due to the tendency of the low melting point materials to accumulate near the bonding interface. This accumulation creates a bond between the layers unsuitable for any subsequent high temperature or high load use. The aluminum base alloy, when in hot bonding contact with steel, causes a high reaction between the two metals with consequent formation of intermediate phases of steel and aluminum alloy which are positioned between the two layers and which are very brittle and tend to fracture along this plane if the composite layer is subjected to subsequent bending or forming operation. Heretofore, the bonding of aluminum alloy to a steel backing member was accomplished by utilizing a temperature above the melting point of the low melting point constituent; the subsequent application of pressure upon the composite strip led to considerable squirting and dislocation of the low melting constituents. The application of such heat upon the low melting constituents, resulted in a low strength interface which made use of the strip for fabrication into bearings virtually impossible. Bearings, particularly those used in the automotive field, are subject to extreme stresses during fabrication and subsequent use. The severe deformation during fabrication demands a strong and resilient bond.

While the interposition of a third layer of metal for instance, such as copper or nickel, has reduced some of the hereinbefore mentioned problems by allowing the application of higher temperatures and correspondingly lower pressures, the interposition of the layer has introduced numerous complicating factors in the manufacturing process.

The present invention is based on the discovery that a substantial percentage of low melting point material, e.g., tin, may be satisfactorily incorporated into an aluminum base alloy provided that the application of heat during the process does not disturb the relative location of the low melting point alloy constituents within the strip.

It is therefore the primary object of this invention to provide a method for making a bimetallic strip suitable for the manufacture of bearings and having a steel layer and an aluminum alloy layer including a substantial percentage of low melting point constituents, e.g., tin, the strip exhibiting a strong and ductile bond between the steel and aluminum layers.

It is a further object of this invention to control the application of heat to provide a strong metallurgical bond between the aluminum alloy, comprised of a high percentage of low melting constituents, and the steel backing member, and to avoid that the low melting point constituents are pressed or squirted out during the bonding operation.

Another object of the invention is to bond aluminum alloy, containing low melting point constituents, directly to steel, without an intermediate layer to facilitate the bonding.

It is another object of this invention to provide an air-sealed chute between a furnace and preheated pressure rolls to preclude exposure of the strip to air prior to the rolling step; and to control the temperature between the furnace and the rolls so that the rolls are effective to act as controlled coolant during the rolling action.

An aspect of the invention is the method of making a bimetallic bearing which comprises selecting a layer of aluminum alloy comprising at least 5% low melting point constituents and selecting a steel backing layer, cleaning and brushing the bonding interface of the layers, passing at least one of the layers through a furnace having a controlled atmosphere and a temperature suitable to avoid dislocation of the low melting point constituents, juxtaposing the layers for heat transfer, passing said layers together through pressure rolls having a temperature between 200° to 350° F. to combine the layers face to face with each other and to effect a strong metallurgical bond therebetween, cutting the layers into sections, and deforming the sections into suitable bearing shapes.

For a better understanding of the present invention, together with other and further objects thereof, reference is had to the following description taken in connection with the accompanying drawings, and its scope will be pointed out in the appended claims.

In the drawings:

FIGURE 1 diagrammatically shows a continuous process in accordance with this invention;

FIGURE 2 is a view similar to FIGURE 1, showing the aluminum alloy layer bypassing the furnace; and FIGURE 3 is an illustration of a flanged bearing.

For carrying out the process in accordance with the invention, steel of the type commercially known as SAE 1010 has been found suitable as a steel backing member. However, the composition of the steel backing member need not be strictly in accordance with SAE 1010. For example, a cold drawn steel such as SAE 1018 may be used. A lower carbon steel is preferred since it endures a greater rolling reduction which results in an improved bond. Also, a lower carbon steel has a lower initial hardness, is less subject to cold working during cladding and forming, and is more readily stress relieved by low temperature annealing.

The composition of the carbon steels is as follows:

|  | SAE 1010 | SAE 1018 |
|---|---|---|
| Carbon | .08–.13% | .15–.20%. |
| Manganese | .30–.60% | .60–.90%. |
| Phosphor | .040% maximum | .040% maximum. |
| Sulfur | .050% maximum | .050% maximum. |

The aluminum alloy composition suitable for this method contains a substantial percentage of low melting bearing constituents, particularly tin, which is desirable for obtaining high bearing qualities. The composition may be substantially as follows:

| | Percent |
|---|---|
| Tin | About 5.0–25.0 |
| Silicon | About 0.5– 2.5 |
| Copper | About 0.5– 1.5 |
| Nickel | About 0.1– 1.0 |

The remainder primarily aluminum.

In preparing the steel for the bonding operation a strip of steel sheet 10 is unwound from a coil 12 and cleaned by means of a vapor degreaser apparatus 14 utilizing trichloroethylene and passed under a wire brush apparatus 16 until the entire bonding surface is scratched or brushed and exhibits a rough lusterless appearance. The steel is passed under the wire brush, which rotates, within a range of 1200 to 2000 surface feet per minute, under sufficient pressure to cut rather than burnish the steel surface.

An aluminum alloy layer 18 is simultaneously unwound from a coil 20, one surface of the aluminum alloy layer is degreased in a degreasing mechanism 22 and brushed by a wire brush device 24 in a manner similar as aforestated. A lighter brush pressure may be applied to scratch and roughen the aluminum alloy layer.

The aluminum alloy layer 18 is then attached to the steel backing member or layer 10 to insure alignment of the layers 33 and to prevent relative slippage thereof. This may be accomplished by drilling an opening into each layer 10, 18 at the leading end thereof to accommodate a rivet 26 or the like. A brass rivet has been found suitable and sufficiently strong to resist shearing forces.

The layers so attached are then passed through a temperature controlling furnace 28. The speed through the furnace depends upon the thickness of the layers. In general, for a composition as described herein a temperature between 700°–800° F. near the interface of the strip has been found to be desirable. The furnace 28 is gas tight and contains a nonoxidizing atmosphere such as an exothermic precombusted mixture of one part natural gas to six and one-half parts air. The discharge end of the furnace is connected to a rolling mill 30, 31 by an air-tight chute 32 to permit transfer of the strip to rollers 30, 31 to prevent the formation of oxidation.

Upon reaching the predetermined composite strip temperature, the strip leaves the furnace and is passed between the pressure rolls 30, 31 which are adjusted to cause a slight reduction in steel layer thickness and a substantial deformation in the aluminum alloy layer. More particularly, the rolls may be adjusted to establish a reduction of 2 to 10% in the steel layer thickness and between 20 and 40% in the aluminum alloy layer.

The rolls 30, 31 may be preheated by a radiant gas burner 34, or other conventional means, to provide an initial roll temperature of 200° to 350° F. During the continuous operation it may at times be necessary to cool the rolls appreciably in order to maintain the proper temperature. A cold water line 36 may supply the cooling means to the rolls. The rolls are coated with colloidal graphite to prevent bonding of the strip to the rolls.

The rolling step itself is of a most critical nature and it must be observed that the roll surface temperature is varied to suit the thickness of the aluminum alloy layer. The bimetallic strip upon leaving the furnace and upon entering between the rolls is relatively soft and is sensitive to pressure, which heretofore has caused the low melting point constituents to be squirted out. In order to prevent such squirting action the strip is passed between temperature controlled rolls, effecting an instantaneous cooling of the bimetallic strip, whereby the temperature is reduced below the melting point of the critical constituents, and simultaneously therewith a suitable and strong metallurgical bond is obtained.

As indicated above a squirting problem arises when the rolls have a surface temperature near or substantially above the melting point of the low melting point constituents. Conversely, the use of cold or substantially cold rolls causes the strip to cool to such a degree so that a suitable bonding can be longer be effected. The method utilized herein avoids the cooling effect of the latter approach and the melting effect of the former by maintaining the rolls at a temperature below the melting point of the low melting point constituents but sufficiently high enough to obtain a satisfactory bond.

Preferably, the surface temperature of the rolls is maintained at least 100°–250° F. below the melting point of the low melting point alloy constituent. When the temperature is maintained within this approximate temperature range, the low melting point alloy constituents are enabled to return to their solid state and are simultaneously bonded to the steel backing member. As above noted, the specific surface temperature of the rolls varies somewhat with the thickness of the particular layer. The following arrangement has been found to be satisfactory. Where aluminum alloy layer has a thickness within the range of .030 inch to .065 inch, it has been found that when the rolls are preheated and maintained at a temperature approximately within the range of 200°–250° F. the preheated rolls provide the desired cooling effect. An aluminum alloy layer having a thickness of .065 inch to .100 inch has a correspondingly roll surface temperature approximately within the range of 225°–275° F. When utilizing an aluminum alloy layer having a thickness within the range of .100 inch to .150 inch an approximate temperature range of 250°–350° F. will satisfy the requirements.

By pre-selecting a given strip thickness and a corresponding roll temperature the resulting bimetallic strip is dimensionally correct and is ready for the cutting and forming operation.

In FIGURE 2 there is illustrated a process and apparatus substantially as aforedescribed. Herein the method is modified in that the aluminum alloy layer 18 bypasses the furnace 28 and enters chute 32 near point 35. This is particularly desirable in a continuous type of operation. The aluminum alloy layer may be brought up to the required temperature by heat transfer contact between the two metals.

As shown, the steel layer 10 is passed through furnace 28 and thereafter attached to the aluminum layer in preparation for the subsequent rolling step.

In FIGURE 3 there is shown a flanged bearing 38. It is well known in the art that the demand on material for a bearing of this type is appreciably greater than for other types of bearings. The amount of low melting point constituents in the soft layer is therefore more critical. The inclusion of 10% to 25% tin has been found to be particularly desirable. The method as described herein produces a bond of such ductility enabling the fabrication therefor without an inter-layer. The bearing 38 is fabricated from the strip 33 after it leaves the rolls 30, 31 and is cut into suitable sections. The section is then deformed by means of a power press into a bearing shape, for instance into a 180° or 360° bend. The bearing may then be worked to provide for further refinements. The strip 33 may be used to fabricate a bimetallic or a trimetallic bearing. In the latter case an additional precision plate is attached to the bimetal, not shown herein.

While there have been described what at present are considered to be the preferred embodiments of this invention, it will be obvious to those skilled in the art that various changes and modifications may be made therein without departing from the invention, and it is aimed, therefore, in the appended claims to cover all such changes and modifications as fall within the true spirit and scope of the invention.

We claim as our invention:

1. An automotive bearing comprising: a steel backing layer and a layer of aluminum alloy metallurgically bonded to said layer face to face; said aluminum alloy layer consisting essentially of 10–25% tin constituents and the balance substantially aluminum.

2. An automotive bearing comprising: a steel backing layer and a layer of aluminum alloy metallurgically bonded to said layer face to face; said aluminum alloy layer consisting essentially of 10–25% tin constituents, additives selected from a group consisting of silicon, copper, and nickel, and the balance substantially aluminum.

3. An automotive bearing comprising: a steel backing layer and a layer of aluminum alloy metallurgically bonded to said layer face to face; said aluminum alloy layer consisting essentially of 10–25% tin constituents, 0.5–2.5% silicon, 0.5–1.5% copper, 0.1–1.0% nickel and the balance substantially aluminum.

References Cited in the file of this patent

UNITED STATES PATENTS

| | | |
|---|---|---|
| 1,892,175 | Stockfleth | Dec. 27, 1932 |
| 2,373,352 | Smart | Apr. 10, 1945 |
| 2,586,100 | Schultz | Feb. 19, 1952 |
| 2,715,259 | Mohler | Aug. 16, 1955 |
| 2,883,739 | Russell | Apr. 28, 1959 |
| 2,916,337 | Fike | Dec. 8, 1959 |
| 2,539,246 | Hensel | Jan. 23, 1961 |